Oct. 9, 1962 M. L. DERTOUZOS 3,058,001

PHOTOELECTRIC ENCODER

Filed April 21, 1960 3 Sheets-Sheet 1

Inventor:
Michael L. Dertouzos
By: Graf, Nierman & Burmeister
Attorneys

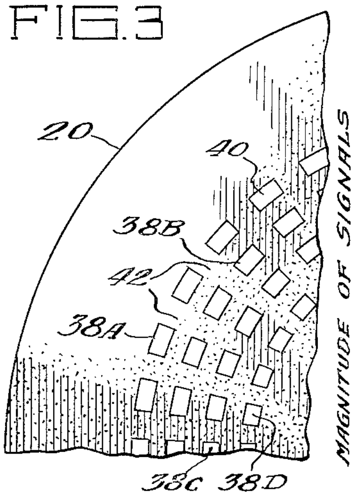
FIG. 5
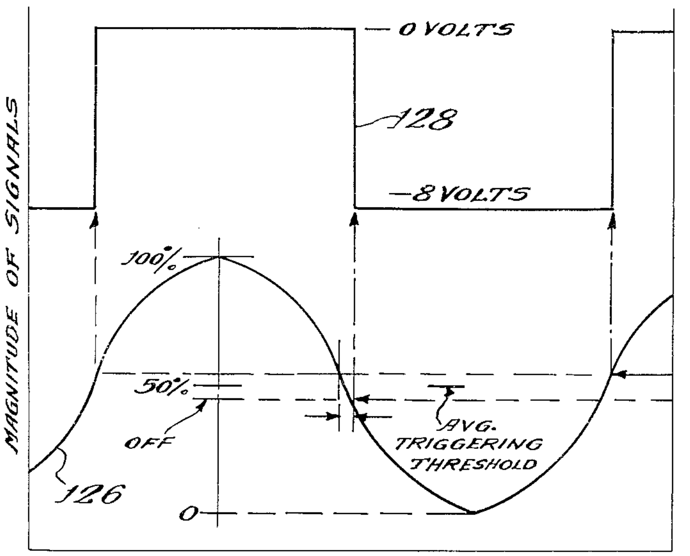
FIG. 6
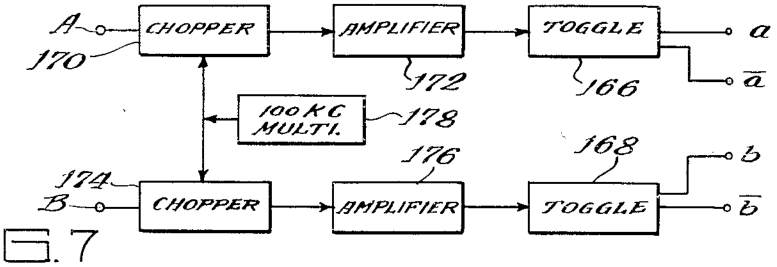
FIG. 7, FIG. 8
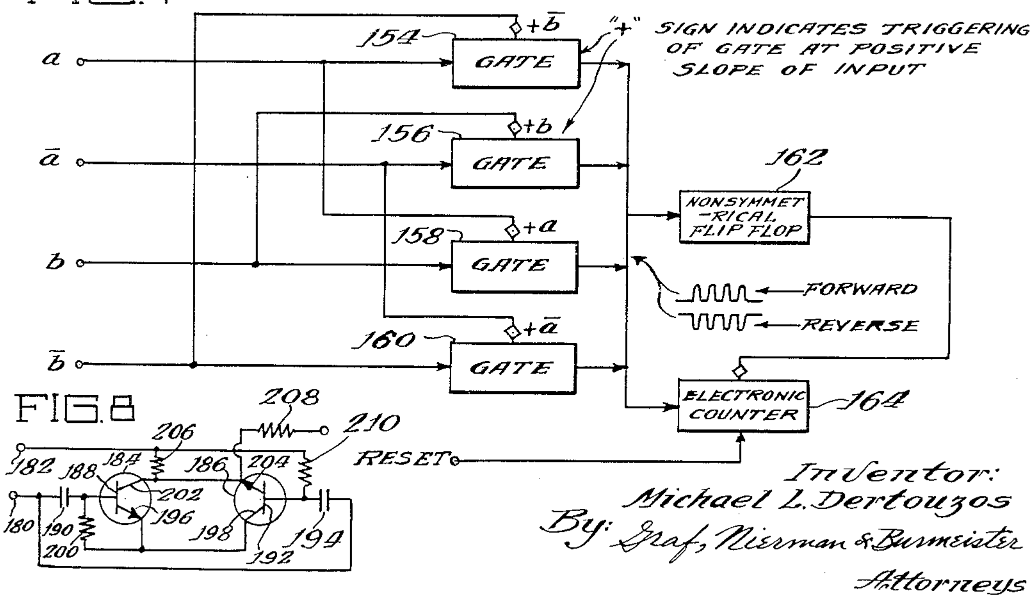
Inventor:
Michael L. Dertouzos
By: Graf, Nierman & Burmeister
Attorneys Inventor:
Michael L. Dertouzos
By: Graf, Nierman & Burmeister
Attorneys

United States Patent Office 3,058,001
Patented Oct. 9, 1962

3,058,001

PHOTOELECTRIC ENCODER

Michael L. Dertouzos, Little Rock, Ark., assignor to The Baldwin Piano Company, Cincinnati, Ohio, a corporation of Ohio Filed Apr. 21, 1960, Ser. No. 23,665
11 Claims. (Cl. 250—208)

The present invention relates to shaft angle encoders, and particularly to photoelectric counter type shaft angle encoders.

In the counter type encoders known to the art, a light chopper, such as a code wheel or serrated disc, is mounted on the shaft to be encoded to interrupt a beam of light falling on a pair of photocells which are located on different radii of the shaft in order to produce two electrical response signals of different phases. The outputs of each of the photocells are connected to counters which record the number of counts from an arbitrary zero position. The counters are reversible, so that each counter indicates the position of the chopper disc from the arbitrary zero position. Since the photocells produce signals which are out of phase with each other, the direction of rotation can be determined by determining which of the two signals leads and which lags.

A major difficulty with counter type shaft position encoders is that the loss of a count permanently shifts the zero position of the encoder. Hence, a transitory error producing cause, such as a sudden drop in line voltage of short duration or the like, will result in erroneous readings even after the error producing cause has been removed, and the encoder must be recalibrated to again establish accurate results. Thus, there is a necessity with counter type encoders that errors in readings be eliminated.

It is one of the objects of the present invention to provide a counter type photoelectric encoder which reduces the probability of erroneous readings.

It is also an object of the present invention to provide a counter type photoelectric encoder capable of encoding shaft rotation rates from zero to a maximum value with greater accuracy than previously known to counter type encoders.

Further, it is an object of the present invention to provide a counter type encoder with a simplified and improved counting mechanism.

These and further objects of the present invention will become more readily apparent upon a further consideration of this disclosure, particularly when viewed in the light of the drawings, in which:

FIGURE 3 is a fragmentary sectional view taken along the line 3—3 of FIGURE 1;

FIGURE 5 is a graph illustrating the relationship between the electrical output of one channel of the encoder to the photocell signal for that channel;

FIGURE 6 is a block electrical circuit diagram of a modified electronic circuit for the encoder of FIGURES 1 through 5;

FIGURE 7 is a block electrical circuit diagram illustrating the counting mechanism of the encoder; and FIGURE 8 is a schematic electrical circuit diagram for the gate circuits shown in FIGURE 7.

Figures 1, 2:
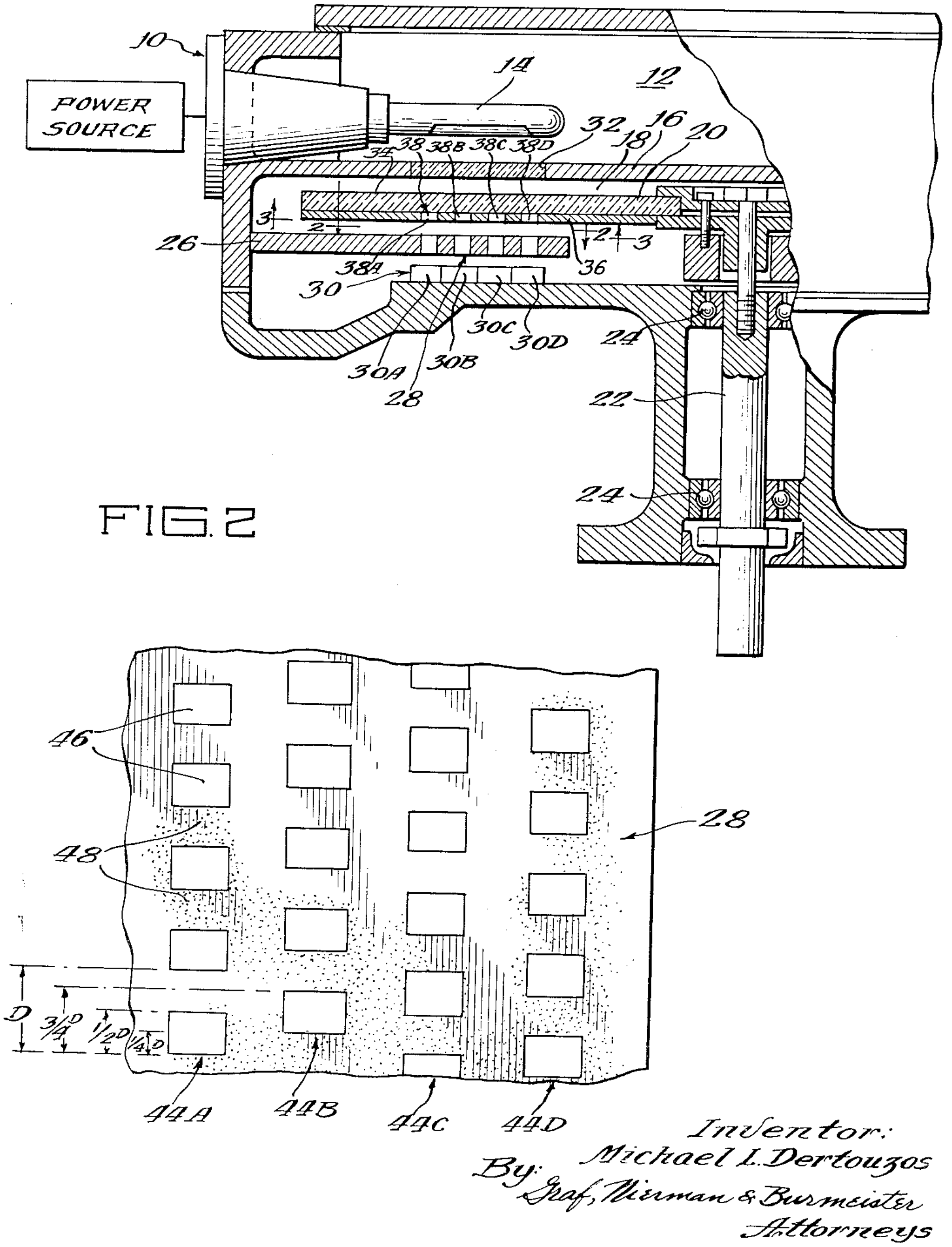
FIGURE 1 is a fragmentary sectional view of a counter type photoelectric encoder constructed according to the teachings of the present invention.
FIGURE 2 is an enlarged fragmentary sectional view taken along the line 2—2 of FIGURE 1.

As illustrated in FIGURE 1, the encoder has a housing 10 with a compartment 12 containing a light source 14.

A wall 16 separates the compartment 12 from a second compartment 18, and a code disc 20 is disposed within the second compartment 18. The code disc 20 is affixed to a shaft 22 which is secured to the housing 10 by bearings 24 and extends from the housing 10. The rotational position of the shaft 22 is encoded by the encoder.

A wall 26 extends into the compartment 18 parallel to the disc 20 and on the side of the disc 20 opposite the light source 14. A grating 28 is disposed within the wall 26 confronting the code disc 20. A photocell assembly 30 with photocells 30A, 30B, 30C and 30D is mounted on the housing 10 confronting the grating 28. The light source 14, an aperture 32 in the wall 16 of the housing 10, the grating 28, and the photocell assembly 30 are aligned on a common plane normal to the code disc 20 and on a radius thereof.

The code disc 20 has a circular transparent base 34, such as glass, and an opaque coating 36 on one side of the base 34. The coating 36 forms four tracks 38 of alternate transparent and opaque sectors 40 and 42, respectively, which extend coaxially about the center of the disc 20. The arc length of each of the transparent sectors in each track is equal, and the arc length of each of the opaque sectors in each track is equal. Also, the transparent sectors of all tracks are disposed between the same radii of the code disc. In the particular construction described, the length of the opaque and transparent segments are selected to produce an output signal in which for a constantly rotating disc the duration of the "one" and "zero" counts is the same.

The grating 28 is best illustrated in FIGURES 1 and 2, and is also provided with four tracks 44A, 44B, 44C and 44D which each contain transparent sectors 46 and opaque sectors 48, the tracks 44A, 44B, 44C and 44D being disposed on circles concentric with the shaft 22 and being such small sectors of said circles as to appear as straight lines in FIGURE 2. Each of the tracks is aligned between one of the photocells of the photocell assembly 30 and one of the tracks of the code disc 20. Track 44A of the grating is aligned with track 38A of the code disc and photocell 30A, track 44B is aligned with track 38B of the code disc and photocell 30B, track 44C is aligned with track 38C and photocell 30C, and track 44D is aligned with track 38D and photocell 30D. Track 44A is an image of track 38A of the code disc, and track 44B is an image of the track 38B of the code disc. In like manner, track 44C images track 38C of the code disc and track 44D images track 38D of the code disc. However, the tracks of the grating 28 are displaced relative to each other to produce electrical responses from the four photocells 30A, 30B, 30C and 30D which are 90 degrees, 180 degrees, and 270 degrees out of phase with respect to the first photocell 30A. That is as indicated in FIGURE 2, the transparent sectors 46 of the track 44A have leading edges separated by a distance D, and the leading edges of the tracks 44B, 44C and 44D lie on radial axes disposed one-fourth, one-half, and three-fourths of the distance D from the leading edges of the transparent sectors of the track 44A.

Figure 4:
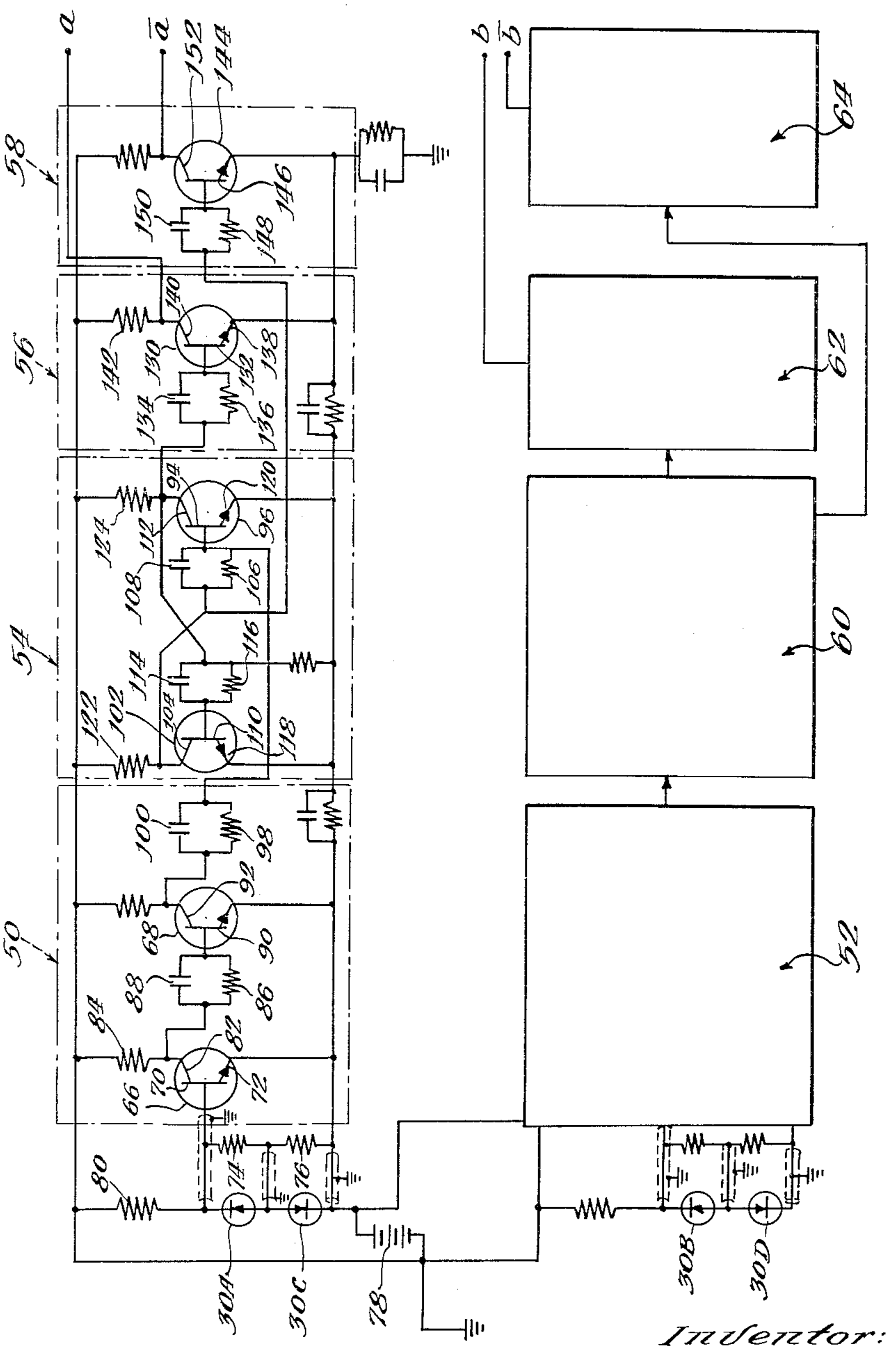
FIGURE 4 is a schematic electrical circuit diagram showing the electrical circuit elements of the encoder illustrated in FIGURES 1 through 3.

The photocells 30A, 30B, 30C and 30D are photovoltaic cells, that is, cells which produce an electrical response to light, such as silicon cells, and cells 30A and 30C are connected in series opposition, while cells 30B and 30D are connected in series opposition. As indicated in FIGURE 4, the cells 30A and 30C are connected to the input of a two stage transistor amplifier 50, while the cells 30B and 30D are connected to the input of a two stage transistor amplifier 52. The output of the amplifier 50 is connected to a toggle circuit 54, and the output of the toggle circuit is connected to an inverter 56 or an inverter 58 depending upon the plurality of the pulse. In like manner, the output of the amplifier 52 is connected to a toggle 60 and the output of the toggle 60 is connected to an inverter 62 or the inverter 64.

FIGURE 4 illustrates the electronic circuit elements which precede the counter mechanism, and FIGURE 7 illustrates the electronic circuits employed in the counter mechanism. The amplifier 50, toggle circuit 54, and inverters 56 and 58 represent one channel of the encoder, and the amplifier 52, toggle 60, inverter 62 and inverter 64 represent the other channel of the encoder. Since each of the channels is identical, only one channel will be described in detail.

The amplifier 50 employs two amplification stages with transistors 66 and 68. The base 70 of transistor 66 is connected to the emitter 72 through two resistors 74 and 76 connected in series. The photovoltaic cell 30A is connected in parallel with the resistor 74, and the photovoltaic cell 30C is connected in parallel with the resistor 76, the cells 30A and 30C being connected so that the electromotive force generated by the cells is in series opposition. The base 70 is also connected to the positive terminal of a power source 78 through a resistor 80, the negative terminal of the power source being connected to the emitter. The collector 82 is connected to the positive terminal of the power source also through resistor 84, and forms the output for the stage. A resistor 86 and capacitor 88 connected in parallel form a coupling network between stages, and are connected between the collector 82 of the transistor 66 and the base 90 of the transistor 68.

Since the transistor 68 is connected in a circuit essentially the same as that described for transistor 66, this stage will not be described in detail. The collector 92 of the transistor 68 is connected to the base 94 of a transistor 96 in the toggle circuit 54 through a resistor 98 and capacitor 100 connected in parallel. The toggle circuit 54 also includes a second transistor 102 which has a collector 104 connected to the base 94 of the transistor 96 through a resistor 106 and capacitor 108 connected in parallel.

Transistor 102 has a base 110 connected to the collector 112 of transistor 96 through a capacitor 114 and resistor 116 connected in parallel. The transistor 102 and transistor 96 have emitters 118 and 120, respectively, which are connected to the negative terminal of the power supply 78. The collector 104 of transistor 102 is connected to the positive terminal of the power supply 78 through a resistor 122, and the collector 112 of transistor 96 is connected to the positive terminal of the power supply 78 through a resistor 124.

The toggle circuit 54 is a bistable multivibrator, and responds to one-half of the sine wave cycle to put transistor 102 in a conducting state, and responds to the other half of the sine wave cycle to place transistor 96 in the conductive state. The purpose of the toggle circuit is to provide definite transitions and a backlash effect, as illustrated in FIGURE 5. The output of the amplifier 50 is illustrated by the sine wave, designated 126, and the output appearing on the collector 112 of the transistor 96 is illustrated by the line 128. It is to be noted that the transistor 96 does not begin to conduct until the voltage applied to the base 94 exceeds the fifty percent level, and likewise the transistor 96 continues to conduct until the amplified photocell signal 126 drops to a value below the fifty percent level. As a result, very slight variations in the angular position of the code disc 20 in the region of a transition will not alter the output of the encoder, and the encoder is capable of operation at zero speed. Larger rotational fluctuations in the position of the code disc 20 result in variations of the least significant digit of the counter.

The inventer 56 is a transistor amplification stage employing a transistor 130 with a base 132 connected to the collector 112 of transistor 96 through a capacitor 134 and resistor 136 connected in parallel. Transistor 130 has an emitter 138 connected to the negative terminal of the power source 78, and a collector 140 connected to the positive terminal of the power source through a resistor 142. The purpose of the inverter stage 56 is to standardize the pulses produced by the toggle circuit 54 and to further reduce the transition interval in the output of the toggle circuit. The inverter 56 also functions to isolate the toggle circuit from the output load of the encoder and thus reduce the output impedance of the encoder.

The inverter circuit 58 is identical in construction to the inverter circuit 56 and employs a transistor 144 with a base 146 connected to the collector 104 of the transistor 102 of the toggle circuit through a resistor 148 and capacitor 150 connected in parallel. A second output for this channel of the encoder is obtained from the collector 152 of the transistor 144, and this output is designated $\bar{a}$ while the output from the inverter 56 has been designated *a*.

The second channel of the encoder employing amplifier 52, toggle 60, and inverters 62 and 64 results in an output from the inverter designated *b* and an output from the inverter 64 designated $\bar{b}$. The outputs *a* and $\bar{a}$ indicate the two conditions of stability of the toggle 54, while the outputs *b* and $\bar{b}$ indicate the two positions of stability of the toggle 60.

It is to be noted that the photocell 30A and the photocell 30C receive light which varies with rotation of the code disc with a phase difference of 180 degrees. That is, when the code disc is at the transition between dark and light for the photocell 30A and rotating toward the light direction, photocell 30C is also at this transition point, but the disc is rotating toward the dark direction with respect to it. Therefore, the electrical output from the photocell 30A is rising, while that from the photocell 30C is falling, and since the photocells are connected in series opposition, the two effects add to provide a greater electrical response, and hence a better light to dark electrical response ratio than could be obtained with a single photocell. The same considerations hold true for the photocells 30B and 30D, however, because of the grating phase relationships, the electrical signal produced by the photocells 30B and 30D is 90 degrees out of phase from that produced by the photocells 30A and 30C. By knowing which of the outputs *a* or *b* leads the other, it is thus possible to determine the direction of rotation of the code disc.

FIGURE 7 illustrates a reversible electronic counter mechanism which determines the direction of rotation of the disc automatically to add or subtract counts, and thus indicate the instantaneous position of the code disc relative to an arbitrary zero point. The output *a* of the first channel of the encoder is connected to a first input of a gate circuit 154, and the output $\bar{a}$ is connected to a first input of a gate circuit 156. In like manner, the output *b* is connected to a first input of a gate circuit 158, and the output $\bar{b}$ is connected to the first input of a gate circuit 160. Each of these gate circuits 154, 156, 158 and 160 is identical in construction and is provided with a second or control input indicated by the small diamond adjacent to the gate block in FIGURE 7. The gate circuits pass both positive and negative pulses when opened by a control pulse. The control input of each of the gate circuits requires a positive going pulse in order to open the gate circuit, and hence conduct the signal impressed upon its first input to its output.

The control input of the gate 154 is connected to the $\bar{b}$ output of the encoder, and the control input of the gate 156 is connected to the *b* output of the encoder. In like manner, the control input of the gate circuit 158 is connected to the *a* output of the encoder, and the control input of the gate circuit 160 is connected to the $\bar{a}$ output of the encoder.

The outputs of the gates 154, 156, 158 and 160 are interconnected, and for rotation of the code disc throughout an angle measured by one cycle of any one of the tracks of the code disc, four pulses appear in the output of the gates. Since each of the gates transmits a pulse from its input to output (whether positive or negative) only when the control input of the gate receives a positive going pulse, all pulses are of the same sign as long as the rotation direction is not reversed. If the rotation of the code disc is in the one direction, the pulses are positive, and if in the reverse direction the pulses are negative. A nonsymmetrical flip-flop 162 has an input connected to the output of the gate circuits 154, 156, 158 and 160. The nonsymmetrical flip-flop triggers to a first stable state for a positive pulse greater than a threshold value and remains in this state until a negative pulse greater than a threshold value is impressed on the flip-flop 162, as set forth in Section 5–7 of "Pulse and Digital Circuits" by Millman and Taub, McGraw-Hill, 1956. Thus, the flip-flop 162 produces a positive output responsive to the initial positive pulse from the gate circuits, and a negative pulse responsive to the initial negative pulse from the gate circuits. The output of the nonsymmetrical flip-flop 162 is connected to a control input of an electronic counter 164, and a second input of the electronic counter 164, is connected to the outputs of the gate circuits 154, 156, 158 and 160. The electronic counter adds or subtracts depending upon the output of the nonsymmetrical flip-flop 162, and merely responds to each of the output pulses from the gate circuits 154, 156, 158 and 160. Electronic counter 164 has in addition a third input which is connected to a potential source through a switch for manual reset. Such reversible counters are commercially available, such as the counters available from Di/An Controls, Inc. of Boston, Massachusetts.

FIGURE 8 shows a gate circuit which is suitable for passing both positive and negative pulses in response to a positive control spike. The control spike is impressed upon the control input designated 180 of the gate circuit, and the signal input 182 receives square wave pulses of both positive and negative sign. The gate circuit employs two transistors 184 and 186. The transistor 184 has a base 188 which is connected to the control input 180 through a capacitor 190. The control input 180 is also connected to the base 192 of transistor 186 through a capacitor 194. Transistor 184 has an emitter 196 which is connected to a collector 198 of transistor 186 and to the base 188 of transistor 184 through a resistor 200. Transistor 184 has a collector 202 connected to an emitter 204 of transistor 186, and also to the signal input 182 through a resistor 206. The output of the gate is taken from the junction of the collector 202 of the transistor 184 and emitter 204 of the transistor 186, and a resistor 208 is connected in series with the output terminal of the gate circuit in order to permit a plurality of gate circuits to be connected in parallel. The base 192 of transistor 186 is also connected to the signal injut 182 through a resistor 210.

When the signal input on the terminal 182 is a positive square wave, transistor 184 is properly biased, and in the event the control spike impressed upon the input 180 is positive, an inverted spike or negative spike will appear in the output of the gate circuit. In like manner, a negative square wave impressed upon the signal input 182 properly biases transistor 186 which acts as an emitter follower and forms a positive going spike at the output terminal in response to a positive spike appearing at the input terminal.

In the embodiment of the invention set forth hereinbefore, direct current amplifiers have been employed to actuate the toggle circuits 54 and 60, the amplifiers being designed 50 and 52. In FIGURE 6, the encoder is illustrated with toggles 166 and 168 which are responsive to a pulse modulation of alternating current. The output of the photocells 30A and 30C is impressed on the input designated A, and the output of the photocells 30B and 30D is impressed upon the input designated B. A mixer 170 and an alternating current amplifier 172 are connected in cascade between the input A and the toggle 166, and a mixer 174 and an alternating current amplifier 176 are connected in cascade between the input B and the toggle 168. An alternating current generator 178, which may be a multivibrator operating at a frequency of 100 kilocycles for example, is coupled to both the choppers 170 and 174.

The output of the toggles 166 and 168, designated *a* and $\bar{a}$ and *b* and $\bar{b}$, respectively, may be used to drive the electronic counting circuit illustrated in FIGURE 7. The construction of FIGURE 6 has the advantage of utilizing alternating current amplifiers, rather than the direct current amplifiers 50 and 52 of FIGURE 4.

The electronic counter circuit of FIGURE 7 results in an output from the gate circuits of positive signals for rotation in one direction and negative signals for rotation in the other direction, and in addition results in four such pulses for a revolution equal to one cycle of any track of the code disc 20. A single positive pulse indicating rotation in one direction or a single negative pulse indicating rotation in the other direction for each cycle of any track of the code disc may be obtained by utilizing only a single gate circuit, such as the gate 154. The gate 154 will be actuated by the positive slope of the $\bar{b}$ output to transmit the pulses from the *a* output to the counter whether positive or negative, thus indicating direction of rotation.

From the foregoing disclosure, those skilled in the art will readily devise modifications to the counter type encoder within the spirit and intended scope of this invention. Further, from the foregoing teachings, applications beyond and in addition to those here set forth will readily present themselves to those skilled in the art. It is therefore intended that the scope of the present invention be not limited by the foregoing disclosure, but rather only by the appended claims.

The invention claimed is:

1. A shaft angle encoder comprising a code disc mounted on the shaft and rotatable therewith, and means to generate two electrical signals responsive to rotation of the shaft which are related by a fixed phase difference including a light source mounted in a fixed position relative to the disc and confronting one side of the disc, and at least two photocells mounted in a fixed position relative to the disc on the side thereof opposite the light source, the code disc having a coaxial track of alternating opaque sectors of equal length and transparent sectors of equal length confronting each photocell, characterized by the construction wherein the transparent sectors confronting each photocell are disposed between the same radii of the code disc, and the photocells have sensitive areas which are large relative to the area of the transparent sectors of the code disc, the photocells being disposed adjacent to each other on an axis parallel to a radius of the code disc, in combiantion with a grating disposed parallel to the code disc between the light source and the photocells having a track confronting each photocell with a plurality of transparent segments spaced by opaque segments, the transparent segments having a length equal to the length of the transparent sectors of the code disc and being spaced along an arc normally intersecting the axis of the photocells by a distance equal to the distance between transparent sectors of the code disc, and the tracks of said grating being displaced relative to each other in a direction normal to the axis of the photocells, whereby rotation of the code disc results in out of phase electrical responses of the photocells.

2. A shaft angle encoder comprising the elements of claim 1 wherein the code disc has four coaxial tracks of transparent and opaque sectors, one track of the code disc confronting each photocell, and all of the transparent segments of the four tracks being located between the same radii of the code disc, the grating having a separate track of alternating transparent and opaque segments confronting each photocell, the transparent segments of each track being located between different axes parallel to different radii of the code disc, whereby rotation of the code disc results in four out of phase electrical responses from the photocells.

3. A shaft angle encoder comprising the elements of claim 2 wherein the first photocell produces an electrical response for rotation of the code disc in one direction 90 degrees out of phase with the second photocell, 180 degrees out of phase with the third photocell, and 270 degrees out of phase with the fourth photocell, in combination with means for electrically connecting the first and third photocells in series opposition and connecting the second and fourth photocells in series opposition, whereby two electrical signals are produced by rotation of the code disc which are 90 degrees out of phase.

4. In combination with electrical wave means for producing first and second electrical signals synchronized with the rotational position of a shaft, said first and second electrical signals being 90 degrees out of phase with each other, a gate circuit having a first input electrically coupled to the first electrical signal and a control input electrically coupled to the second electrical signal, said gate passing both positive and negative signals from the first input to an output during periods in which the second electrical response signal is of a given polarity, whereby positive pulses appearing in the output of the gate circuit indicate rotation of the shaft in one direction and negative pulses indicate rotation of the shaft in the reverse direction.

5. In combination with means producing in response to the rotational position of a shaft in a given direction a first electrical response signal, a second electrical response signal which is 90 degrees out of phase with the first signal, a third electrical response signal which is 180 degrees out of phase with the first signal, and a fourth electrical response signal which is 270 degrees out of phase with the first signal, first, second, third and fourth gate circuits, each gate circuit having a signal input, a control input and an output and conducting signals of both positive and negative polarities between the signal input and the output during periods in which a signal of one predetermined polarity is impressed on the control electrode, the signal input of the first gate circuit being coupled to the first electrical response signal, the signal input of the second gate being coupled to the second electrical response signal, the signal input of the third gate circuit being coupled to the third response signal, the signal input of the fourth gate circuit being coupled to the fourth response signal, and the outputs of the gate circuits being interconnected, the control input of the first gate circuit being coupled to the fourth response signal, the control input of the second gate circuit being coupled to the third response signal, the control input of the third gate circuit being coupled to the first response signal, and the control input of the fourth gate circuit being coupled to the second response signal.

6. A shaft angle encoder comprising the elements of claim 1 in combination with a gate circuit having a first input, a control input, and an output, the first input being electrically coupled to the means to generate two electrical signals to impress one of said signals on said first input, said control input being electrically connected to the generating means and coupled to the second of said signals, and said gate circuit transmitting pulses of either polarity from the first input to the output responsive to a pulse of predetermined polarity impressed upon the control input.

7. A shaft angle encoder comprising the elements of claim 5 wherein the means for producing a first, second, third and fourth electrical response to the rotational position of the shaft comprises a code disc having four coaxial tracks of transparent and opaque sectors, the transparent sectors of said disc being radially aligned, a photocell confronting each of the tracks on one side of disc and a light source confronting the other side of the disc, the photocells being aligned on a radius of the disc, and a grating mounted between the light source and photocells parallel to the disc having a separate track of opaque and transparent segments equal in length and equally spaced to those of the code disc, the leading edges of the transparent segments of the second, third and fourth tracks being advanced by one-fourth, one-half and three-fourths, respectively, of the distance between the leading edges of adjacent transparent segments of the first track.

8. An encoder comprising the elements of claim 4 wherein the gate comprises first and second transistors each having a base, collector, and emitter, the second electrical response signal being coupled through two capacitors to the bases of the two transistors, the emitter of the first transistor being connected to the collector of the second transistor and the collector of the first transistor being connected to the emitter of the second transistor, and the first electrical response signal being coupled to the collector of the first transistor and the base of the second transistor through resistors, whereby the output of the gate appears on the collector of the first transistor.

9. A shaft angle encoder comprising the elements of claim 4 in combination with a reversible counter, said counter having a first input connected to the output of the gate and a control input, the counter being responsive to both positive and negative pulses applied to the first input and adding or subtracting in response to the polarity of the potential applied to the control input and a nonsymmetrical flip-flop connected between the output of the gate and the control input of the counter, said flip-flop being triggered in one direction by positive pulses and in the other direction by negative pulses from the gate.

10. An encoder comprising the elements of claim 4 in combination with a first toggle circuit connected between the means for producing the first electrical responsive signal and the first input of the gate, and a second toggle circuit connected between the means for producing a second electrical response and the control input of the gate.

11. A shaft angle encoder comprising the elements of claim 3 in combination with a first toggle circuit having an input coupled to the first and third photocells and an output, and a second toggle circuit having an input coupled to the second and fourth photocells and an output, whereby four outputs are provided by the two toggles which differ in phase by 90 degrees, 180 degrees and 270 degrees when the code disc rotates in one direction.

References Cited in the file of this patent

UNITED STATES PATENTS

| | | |
|---|---|---|
| 2,656,106 | Stabler | Oct. 20, 1953 |
| 2,685,082 | Beman et al. | July 27, 1954 |
| 2,788,519 | Caldwall | Apr. 9, 1957 |
| 2,796,598 | Cartwright | June 18, 1957 |
| 2,941,088 | Mahaney | June 14, 1960 |
| 2,944,157 | McAuslan et al. | July 5, 1960 |
| 2,981,844 | Broxon | Apr. 25, 1961 |